United States Patent
Bacon et al.

(10) Patent No.: US 6,317,082 B1
(45) Date of Patent: Nov. 13, 2001

(54) WIRELESS CALL TAG BASED MATERIAL REPLENISHMENT SYSTEM

(75) Inventors: Thomas M. Bacon, St. Clair, MI (US); Huong M. Hang; Walter S. Johnson, both of San Jose, CA (US)

(73) Assignee: Wherenet Corp, San Ramon, CA (US)

( * ) Notice: Subject to any disclaimer, the term of this patent is extended or adjusted under 35 U.S.C. 154(b) by 0 days.

(21) Appl. No.: 09/503,675

(22) Filed: Feb. 14, 2000

Related U.S. Application Data

(60) Provisional application No. 60/120,122, filed on Feb. 16, 1999.

(51) Int. Cl.[7] .............................. G01S 3/02; G06F 17/60; G06F 19/00; G08B 5/22
(52) U.S. Cl. ................... 342/465; 235/385; 340/825.49; 700/116; 700/215
(58) Field of Search ................................... 700/115, 116, 700/179, 214, 215, 222; 235/385; 705/28; 342/387, 465, 450; 340/680, 679, 10.42, 825.49

(56) References Cited

U.S. PATENT DOCUMENTS

| | | | |
|---|---|---|---|
| 3,714,573 | * | 1/1973 | Grossman ............................ 342/387 |
| 4,561,060 | * | 12/1985 | Hemond .............................. 700/113 |
| 4,742,470 | * | 5/1988 | Juengel ............................... 700/175 |
| 5,119,104 | * | 6/1992 | Heller ................................. 342/450 |
| 5,742,635 | | 4/1998 | Sanderford, Jr. ..................... 375/200 |
| 5,745,049 | * | 4/1998 | Akiyama et al. ............... 340/870.17 |
| 5,920,287 | | 7/1999 | Belcher et al. ...................... 342/450 |

* cited by examiner

*Primary Examiner*—Gregory C. Issing
(74) *Attorney, Agent, or Firm*—Allen, Dyer, Doppelt, Milbrath & Gilchrist, P.A.

(57) ABSTRACT

A call tag-based material replenishment system employs a tagged object radio location infrastructure of the type described in the U.S. Pat. No. 5,920,287. For each different part used by a lineside workstation an associated 'call' tag is placed at or near that workstation. To initiate replenishment of a part, a 'call' push-button on a call tag is operated. In response to the operation of the call button, an RF signal burst containing tag identity and status data is transmitted from the call tag. This information is recovered by a spatially distributed reader and processor subsystem for application to an asset management database. The database associates the call tag's identification data with a particular part, to enable a resource management operator to specify what component is to be accessed from storage and delivered to the requesting call tag's workstation.

20 Claims, 3 Drawing Sheets

WIRELESS CALL TAG BASED MATERIAL REPLENISHMENT SYSTEM

CROSS-REFERENCE TO RELATED APPLICATION

The present application claims the benefit of U.S. Provisional Patent Application Ser. No. 60/120,122, filed Feb. 16, 1999.

FIELD OF THE INVENTION

The present invention relates in general to material replenishment for product manufacture and/or assembly systems, and the like, and is particularly directed to a wireless (e.g., radio) call tag-based communication network that is readily installable in the (assembly line) infrastructure of a production facility, and which is operative to facilitate a (line-side) workstation user's requesting and obtaining delivery from (off-line) storage of one or more components used by that workstation in the course of its operation.

BACKGROUND OF THE INVENTION

Manufacturers of a wide variety of products currently employ a material resupply technique, commonly referred to as 'pull manufacturing', to replenish parts or materials required by an assembly line-side workstation in the course of its participation in the production of an item of manufacture. A reduced complexity illustration of such a conventional pull manufacturing scheme is diagrammatically illustrated in FIG. 1 as comprising a plurality of line-side workstations, two of which are shown as workstations 1 and 2, that are distributed along an assembly line served by a conveyor 3. As an item 4 being assembled is conveyed along the assembly line, each workstation performs a respective subassembly operation that incorporates one or more parts or materials into the item. Thus, as shown at workstation 1, a part 41 is installed into the item; next, at a workstation 2, downstream of workstation 1, a part $4_2$ is added to the partially assembled item, and so on down the assembly line.

In accordance with conventional 'pull manufacturing' material replenishment, the components at any given workstation, shown in FIG. 1 as contained in local inventories of parts $4_1$ and $4_2$, respectively associated with line side sites 1 and 2, are updated in response to a request or 'call' from the workstation to a remote storage management and distribution subsystem. In response to the part request, the storage management and distribution subsystem then retrieves some number of the requested part from an off-line storage facility and delivers them to the requesting site.

In order for such an 'optimal efficiency' pull manufacturing replenishment scheme to be successful, it must be reliable, flexible and provide 'on-time' delivery. Unfortunately, within most of today's manufacturing environments, options for communicating material replenishment requests to those responsible for delivering the parts to a line-side workstation are considerably limited. A significant number of production facilities continue to employ traditional manual, labor-intensive routines, such as card-based methods. Others, which have attempted to incorporate upgraded communication methods, use hardwired subsystems, that are not only costly to install but, due to their inherent inflexibility, are expensive, time consuming, and labor intensive to retrofit or modify, as the needs and/or retooling of the plant are continually being updated and reconfigured. Although some wireless call systems have been proposed, they are complex, requiring two-way communications with a line-side location, and are thus extremely expensive to install and operate.

SUMMARY OF THE INVENTION

Pursuant to the present invention, the above-described shortcomings of conventional material replenishment systems are effectively obviated by a wireless 'call tag' based system, that is configured to take advantage of the communication and signal processing infrastructure of the tagged object radio location system of the type described in the U.S. Pat. No. 5,920,287, to D. Belcher et al, (hereinafter referred to as the '287 patent), the disclosure of which is incorporated herein.

In the tagged object radio location system described in the '287 patent, a plurality of transmission burst emission readers are distributed throughout a facility (such as a manufacturing plant or warehouse), that contains the objects to be monitored. These readers are operative to detect spread spectrum signals (repetitively and randomly) emitted by radio transmitter circuits within tags affixed to the objects being tracked. Each spread spectrum RF burst transmitted by a tag is encoded with information, including the identification of the tag and other optional parameter data. As the burst emissions are detected by a respective reader they are coupled to an associated correlation-based RF signal processor, which determines which spread spectrum signal received by the reader is the first-to-arrive signal from a tag. A tag-location processor then processes first-to-arrive signals from at least three tag transmission readers in accordance with a multilateration algorithm, and computes the location of the tag.

The present invention makes use of the spatially distributed reader and associated signal processor infrastructure of the tag-based system described in the '287 patent, by installing one or more 'call tags' at or in proximity of each workstation of a production assembly line where parts are replenished on an 'as needed' basis. Each call tag is associated with and is used to specify a particular component employed by its workstation; if a workstation makes use of different components, the workstation will be equipped with multiple call tags—one for each different component. As in the '287 patent, each call tag contains a transmitter that is operative to controllably transmit a spread spectrum RF signal containing encoded information including the identity of the call tag and other optional parameter information. When a component is to be replenished, a line-side workstation operator simply pushes a 'call' button on the tag.

In response to operation of the call button, the call tag's RF transmitter transmits or 'blinks' a spread spectrum RF signal burst encoded with the identification (e.g., serial number) of the tag. At the same time, an LED indicator is illuminated on the call tag to confirm to the operator that the 'part call' was transmitted. The RF burst emitted by the call tag is detected by at least one and typically a plurality of burst emission readers of a transmission burst monitoring and processing subsystem of the type described in the '287 patent, distributed within and/or around the workstation production environment of the manufacturing plant.

In the tag-based geolocation system of the '287 patent, first-to-arrive tag burst emissions detected by multiple (at least three) tag transmission readers are processed by a tag-location processor to compute the location of the tag. Such tag 'location' processing may also be carried out in the system of the invention, for example, to verify the location of the call tag, as specified in a resource management database. This geolocation feature can be especially useful in a changeable manufacturing environment, as it enables the replenishment scheme of the present invention to rapidly dynamically conform with whatever environment configuration variations may be made to the manufacturing plant (which can be expected to be subject to continual modification over time).

However, since the locations of lineside workstations where the tags are employed are normally known, a priori, tag geolocation processing is not necessarily required. Instead, the availability of multiple tag emission readers provides redundancy and thus a high degree of reliability in detecting and recovering the data encoded in a call tag's transmission burst. The fact that the transmission bursts are spread spectrum signals serves to make the transmissions effectively jam-resistant.

Irrespective of whether or not first-to-arrive signals from plural (at least three) readers are used to determine call tag location, the signal processing subsystem reads whatever identification and other data was conveyed in the call tag transmission burst. The call tag identification data is then used by a resource management operator to access a relational database, which stores information associating each call tag's identification data with a particular part employed by the workstation where the call tag is located. This readily enables the resource management operator to specify what component is to be accessed from storage, so that the part may delivered to the identified call tag's associated workstation.

For part call completion verification and inventory tracking purposes, a record of each part request and delivery transaction may be forwarded from the resource management processor to a (fixed or mobile) data terminal associated with the plant's parts storage area. A part delivery operator may then clear or reset the request once the material has been delivered to the lineside workstation that originated the parts replenishment request.

DETAILED DESCRIPTION

Figure 1:
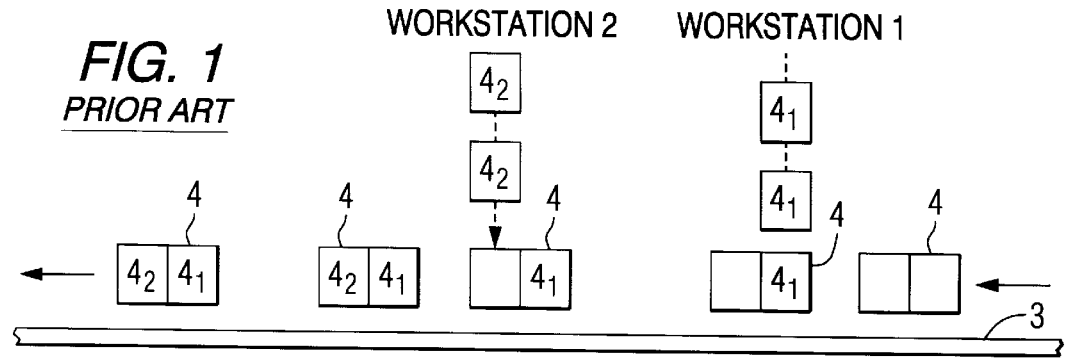
FIG. 1 diagrammatically illustrates a reduced complexity illustration of a pull manufacturing assembly line.

Before describing in detail the new and improved wireless call tag-based material replenishment system in accordance with the present invention, it should be observed that the invention resides primarily in what is effectively a prescribed arrangement of conventional communication circuits and associated digital signal processing components and attendant supervisory control circuitry therefor, that controls the operations of such circuits and components. Consequently, the configuration of such circuits components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

Figure 2:
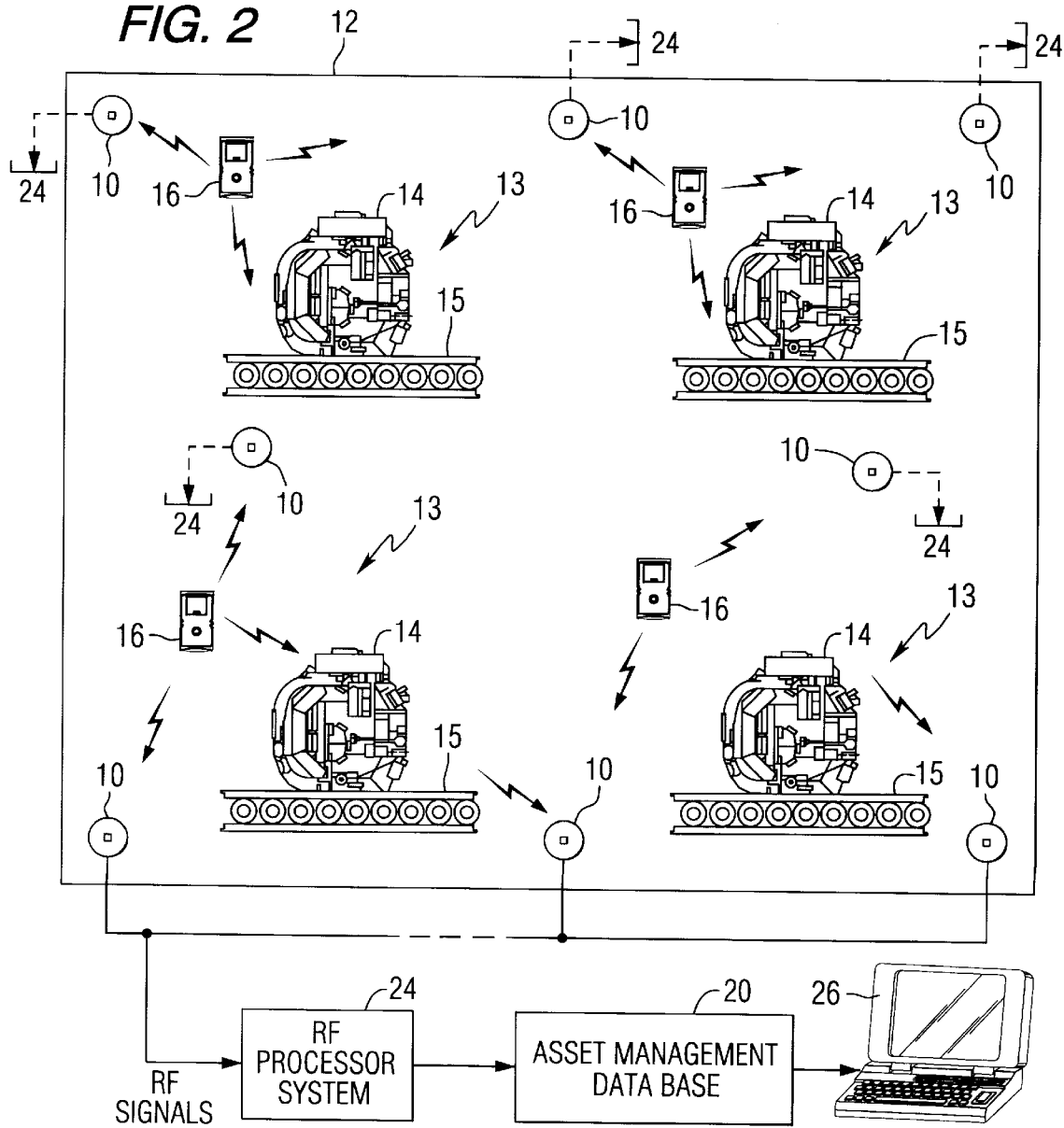
FIG. 2 diagrammatically illustrates the general architecture of a radio geolocation system of the type described in the '287 patent and employed for part/material replenishment using a wireless call tag in accordance with an embodiment of the invention.

As the wireless call tag-based part replenishment scheme of the present invention is designed to take advantage of the communication and signal processing infrastructure of the object radio location system of the type described in the above-referenced '287 patent, the overall architecture of that radio location-based object tracking system, particularly in the context of the environment of a manufacturing plant's assembly line infrastructure will be briefly reviewed. As shown diagrammatically in FIG. 2, the general architecture of a system of the type described in the '287 patent and employed for part/material replenishment using a call tag in accordance with an embodiment of the invention comprises a plurality of tag emission readers 10, which are geographically distributed within and/or around a prescribed asset management environment 12 containing a plurality of objects/assets, whose locations are to be monitored on a continuous basis and reported to an asset management data base 20. The data base 20 is accessible by way of a standard computer workstation or personal computer, as shown at 26. Each tag emission reader 10 is operative to monitor the asset management environment for emissions from call tags associated with monitored objects.

Although, in the tracking system of the '287 patent, the objects being monitored and tracked are not limited to any particular type, nor are their locations necessarily or expected to be fixed, in the call tag-based lineside workstation replenishment system of the present invention, the objects of interest are what are referred to herein as 'call tags' 16, which are associated with components (parts/materials) employed by line-side workstations of a production facility, and can therefore be expected to be located at fixed workstation locations 13 along an assembly line 15, where local inventories of parts and materials are maintained for on-line production of items 14.

Figure 3:
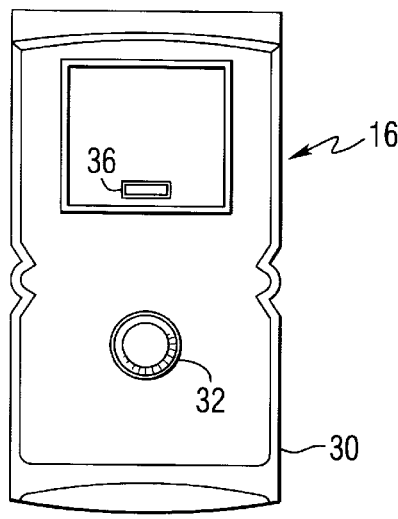
FIG. 3 is a pictorial illustration of the general physical configuration of a part replenishment call tag used in the present invention.
Figure 4:
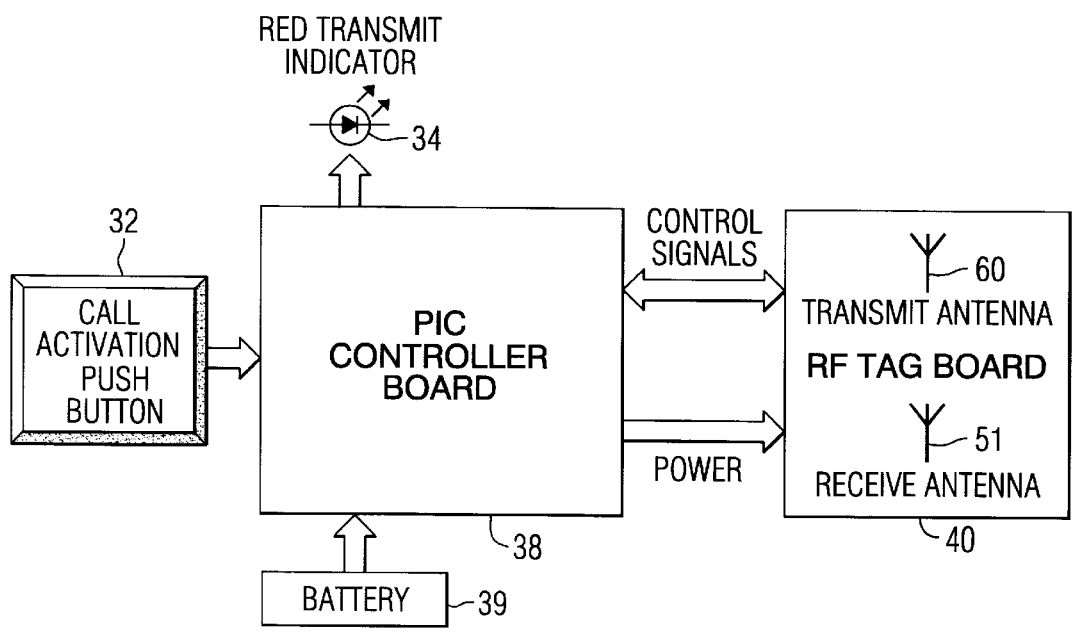
FIG. 4 is a block diagram of the circuitry contained in the call tag of FIG. 3.

As in the tagged object location and tracking system of the '287 patent, a respective part replenishment call tag 16 (the general physical configuration of which is shown pictorially in FIG. 3 and a block diagram of which is shown in FIG. 4, to be described) is operative to transmit or 'blink' a very short duration, wideband (spread spectrum) pulse of RF energy, that is encoded with the identification of the call tag, and other optional information that may be stored in memory within the circuitry of the call tag's transmitter electronics.

Except when a call operation is invoked, the circuitry of the call tag 16 is designed to repetitively transmit an RF burst in a random and repetitive manner. As in the system described in the '287 patent, these random and repetitive transmissions enable location and other relevant parameter data associated with each call tag stored in the asset management database to be updated at some reasonable repetition rate or frequency, thereby enabling plant supervisory personnel to make fully informed decisions with respect to the disposition and usage of the call tags.

For this purpose, during its quiescent or standby mode, namely when not being triggered to transmit a part replenishment call, the transmission circuitry of a respective call tag is operative to emit a very short (e.g., 100 millisecond) duration, wide bandwidth (spread spectrum) RF pulse, having a repetition rate that varies with the application (from tens of seconds to several hours, for example). The interval between such pulses is selected to minimize the probability of collisions (two or more tags transmitting at the same time). Though highly unlikely, should a collision occur, due to the random retransmission times, there is a high degree of certainty that information from the tags whose transmissions collided will be received at the tag's next transmission time, so that the system database will be updated in a period covering at most two transmission intervals. The net result of each such autonomous call tag emission being of short duration and repeated with relatively long intervals between bursts is that the call tag's transmitter spends most of its time in a standby (powered down) mode, yet does not go extended intervals without 'blinking'.

As illustrated in FIG. 3, the call tag may be physically configured as a generally rectangularly shaped transceiver housing 30, which allows the call tag to be readily mounted to a variety of line-side support fixtures and surfaces, such as an assembly line wall or railing. To provide robust performance in a variety of (indoor and outdoor) environments, the housing is manufactured of a durable, water and chemical resistance material, and is configured to seal the interior components against intrusion of moisture, dust and other contaminants from the environment.

The tag's housing 30 contains a number of input/output (I/O) units, such as a push-button 32 and an indicator 34. The push-button 32, like the housing proper, is configured to be provide a seal against the introduction of moisture and dust, and employed by a (line-side) operator to trigger the operation of the call tag. The indicator 34 comprises a red light emitting diode (LED), that is illuminated when a replenishment transmission is sent.

The functional architecture of the call tag's internal circuitry is illustrated in the block diagram of FIG. 4 as comprising a supervisory control processor (microcontroller board) 38, with which each of the I/O units 32 and 34 is coupled. Power for the call tag is supplied by a battery 39. Coupled to the control processor 38 is an RF transceiver unit 40, which may be generally of the type employed in the tags employed in the system described in the above-referenced '287 patent, but modified in the manner schematically illustrated in FIG. 5 to be interface with the control processor board 38.

Figure 5:
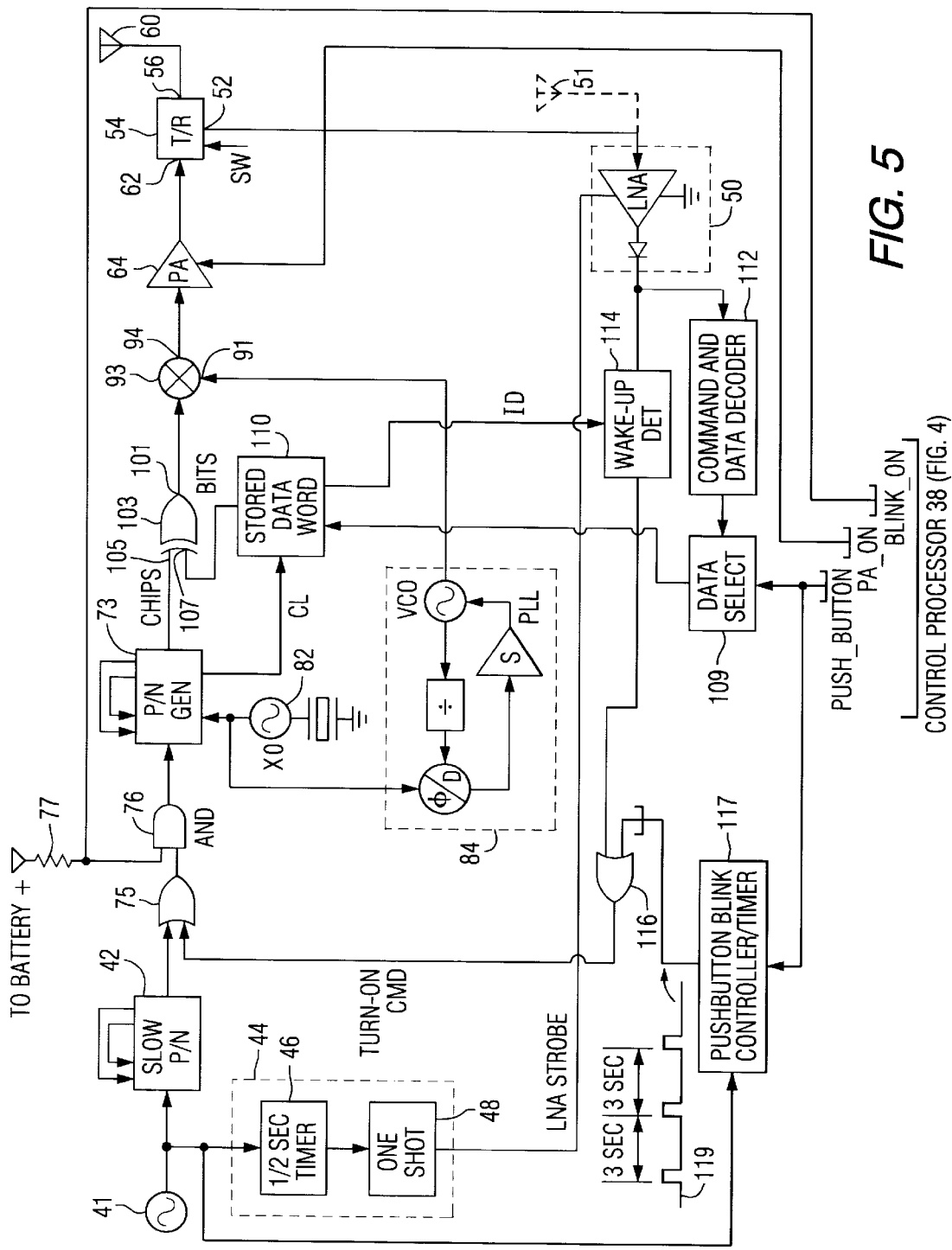
FIG. 5 shows the circuitry of the tag transceiver unit of FIG. 4.

More particularly, as shown in FIG. 5, the call tag's RF transceiver unit 40 may comprise a relatively coarse (RC) oscillator 41, whose output is fed to a 'slow' pseudo random pulse generator 42, a strobe pulse generator 44, and a push button blink timer circuit 117. The strobe generator 44 contains a timer 46 having a prescribed time-out duration (e.g., one-half second) and a (one-shot) delay circuit 48, the output of which is a low energy (e.g., several microamps) receiver enable pulse having a prescribed duration (e.g., one-second wide). The receiver enable pulse enables or strobes a relatively short range receiver 50, such as a crystal video detector, which requires a very low amount of power compared to other components of the tag. Because the receiver enable pulse is very low power, it does not effectively affect the call tag's battery life. The duration of the receiver enable pulse produced by the strobe pulse generator 44 may be defined such that any low power signal transmitted by another device will be detected by the crystal video receiver 50.

Where the call tag employs a common antenna 60 for both transmit and receive, the crystal video receiver 50 may have its input coupled to a receive port 52 of a transmit/receive switch 54, a bidirectional RF port 56 of which is coupled to an antenna 60. The transmit/receive switch 54 has a transmit port 62 coupled to the output of an RF power amplifier 64, which is powered up only during the relatively infrequent transmit mode of operation of the call tag. Alternatively, where the call tag employs separate transmit and receive antennas (as shown at 60 and 51 in the block diagram of FIG. 4), the crystal video receiver 50 may have its input coupled to a receive antenna 51, as shown by broken lines.

The output of the 'slow' pseudo random pulse generator 42 is a series of relatively low repetition rate (for example, from tens of seconds to several hours), randomly occurring 'blink' pulses. These pulses are coupled to a high speed PN spreading sequence generator 73 via an OR gate 75 and an AND gate 76, and serve to define when the call tag is to randomly transmit bursts of wideband (spread spectrum) RF energy (to be detected by the system readers) during its quiescent mode. In response to an enabling pulse, the high speed PN spreading sequence generator 73 generates a prescribed spreading sequence of PN chips. AND gate 76 has a second input hardwired via a pull-up resistor 77 to a battery supply voltage +V, and to a 'BLINK_ON' output from the microcontroller 38. When the 'BLINK_ON' signal is at a logical '0', AND gate 76 is disabled, placing the call tag is in the 'OFF' mode, so that no spread signal will be transmitted.

The PN spreading sequence generator 73 is driven at the RF frequency output of a crystal oscillator 82, which provides a reference frequency for a phase locked loop 84, that is used to establish a prescribed output frequency (for example a frequency of 2.4 GHz, to comply with FCC licensing rules). The RF output of loop 84 is coupled to a first input 91 of a mixer 93, the output 94 of which is coupled to RF power amplifier 64. The power amplifier 64 is coupled to supply a transmitter operational state signal PA_ON to the microcontroller 38 to indicate that the RF transmitter unit 40 has been 'awakened' and has 'blinked' an RF burst. The mixer 93 has a second input 95 coupled to output 101 of a spreading sequence modulation exclusive-OR gate 103. A first input 105 of exclusive-OR gate 101 is coupled to receive the PN spreading chip sequence generated by PN generator 73. A second input 107 of OR gate 101 is coupled to receive respective bits of data stored in a memory 110, which are clocked out by the PN spreading sequence generator 73.

As a non-limiting example, the tag memory 110 may comprise a relatively low power, electrically alterable CMOS memory circuit, which stores a multibit word or code identifying the call tag. The memory circuit 110 may also store auxiliary data, that may be coupled thereto by an associated data logic circuit 109. The data select logic circuit 109 is coupled to receive information supplied by the microcontroller 38, such as a PUSH_BUTTON signal associated with the operation of the push button 32, as well as data contained in a message that has been transmitted to the call tag from another wireless device, and has been decoded by a command and data decoder 112, coupled in circuit with the output of the crystal video receiver 50.

The data select logic circuit 109 is preferably implemented in gate array logic and is operative to append any data received from an external radio source to that stored in memory 110. It may also selectively filter or modify data output by the command and data decoder 112, as downloaded from an external radio source. When a wireless (RF) transmission from an external radio source is received, the call tag's identification code stored in memory 110 is coupled to a 'wake-up' comparator 114, which compares the bit contents of the received message with the stored call tag identification code. If the two codes match, the comparator 114 generates an output signal, which is used to cause any data contained in the incoming message to be decoded by the command and data decoder 112, and written into tag memory 110 via the data select logic circuit 109. The output of comparator 114 is coupled through an OR gate 116, OR gate 75 and an AND gate 76 to the enable input of PN generator 73. In response, the call tag's transmitter generates a response RF burst, in the same manner as it 'blinks' a PN spreading sequence transmission containing its identification code and any data stored in memory 110, as described above.

The OR gate 116 is also coupled to a push button blink timer circuit 117, which is operative to generate a prescribed (repetitive) timing signal in response to the controller board 38 detecting the operation of the push button 32 and supplying a transmit command signal PUSH_BUTTON. As a non-limiting example, the transmit command timing signal may comprise a series of enabling pulses 119 (e.g., three in the example shown), which cause the transmitter unit to emit a sequence of 'part call' RF bursts (e.g., at a rate of one enabling pulse every three seconds), each of which contains a call tag identification code and any optional data stored in memory 110.

As described above, when a component is in need of replenishment, a line-side workstation operator, who would typically be a human operator (although a robotic operator could perform the same function), simply pushes the 'call' button 32. In response to operation of the call button, the call tag's microcontroller 38 generates a PUSH_BUTTON command signal, which is coupled to the timer circuit 117 and to the data select logic circuit 109, as described above. The timer circuit supplies a series of 'blink' enabling pulses 119 to the OR gate 116 and thereby through OR gate 75 and the AND gate 76. Coupling the PUSH_BUTTON signal to the data select logic circuit 109 for storage into the tag memory 110 causes a 'button pushed' status code to be appended to the call tag's identification code in order to distinguish a part call from a random blink (which normally has no push-button-associated status bits asserted).

The generation of a plurality of enabling pulses 119 by the timer circuit 117 serves to enhance communication reliability. As pointed out above, each enabling pulse causes the call tag to transmit a spread spectrum RF signal burst encoded with the identification (e.g., serial number) of the call tag and part call status data downloaded by the call tag's microcontroller to memory 110 through the data select logic 109. At the same time, the microcontroller 38 supplies a drive signal to the LED indicator 36, which is then illuminated or 'flashed' for a prescribed period of time (e.g, one second) to confirm to the operator that a 'part call' burst has been transmitted.

The 'part call' RF burst emitted by the call tag is received by at least one and typically a plurality of burst emission readers 10 that are distributed within and/or around the workstation production environment of the manufacturing plant. As pointed out above, the architecture and operation of the tag readers 10 and associated correlation-based, RF signal processors corresponds to that shown and described in the '287 patent, which may be referenced for a detailed description thereof. Suffice it to say that the use of correlation-based RF signal processors with the spatial distribution of multiple readers facilitates determining which spread spectrum signals transmitted by a call tag and received by a respective reader is a first-to-arrive transmission, so that an accurate determination can be made of the location of the call tag and therefore the destination of the delivery of the parts request in the call may be confirmed.

In addition to determining call tag location, (identification and status) data read out of the call tag's memory and superimposed on the call tag transmission is downloaded to the asset management data base 20, and linked therefrom to personal computer 26, which is programmed to display call tag location and associated parameter data in a form customized for the user's application. As pointed out above, in the case of line-side part replenishment, the decoded data may be displayed on a floor plan map of the manufacturing plant, to facilitate assimilation of information relating to the workstations' part replenishment requests and line-side delivery of those parts from storage. Whether or not the outputs of the transmission readers are used to locate the call tag, the call tag identity (such as a call tag serial number) and any other (e.g., call status) data that was conveyed in the call tag's replenishment transmission burst is coupled to the asset management database 20, which associates the identification data with a particular part employed by the workstation where the call tag is located.

This allows the resource management operator to specify what component is to be accessed from storage, so that the requested part may delivered to the identified call tag's associated workstation. For part call completion verification and inventory tracking purposes, a record of each part request and delivery transaction may be forwarded from the resource management processor to a (fixed or mobile) data terminal associated with the plant's parts storage area. A part delivery operator may then clear or reset the request once the material has been delivered to the workstation that originated the replenishment request.

As will be appreciated from the foregoing description, the shortcomings of conventional material replenishment systems are effectively obviated by the wireless call tag based system of the invention, which takes advantage of the communication and signal processing infrastructure of the tagged object radio location system of the type described in the '287 patent, making the invention relatively easy and inexpensive to install. Once a respective call tag has been provided for each part or material type employed by a lineside workstation, all that is necessary to initiate the replenishment of a given part is for an operator to operate a push-button on that part's call tag. Call tag identity and status data conveyed in the replenishment request transmission burst, that has triggered by operation of the push-button, is recovered by the distributed reader and processor subsystem for application to an asset management database. This database associates the call tag's identification data with a particular part, so as to enable the resource management operator to specify what component is to be accessed from storage and delivered to the requesting call tag's associated workstation.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. For use with a system for producing an item from a plurality of different components, which are retrieved from storage remote with respect to workstations of said system and delivered to said workstations for use thereby in production of said item, a method of controlling replenishment of components employed by a respective workstation comprising the steps of:

(a) providing, at said respective workstation, a wireless transmitter device which is operative, in response to a stimulus applied thereto associated with the need for replenishment of a component, to controllably transmit a signal encoded with information representative of the identification of said wireless transmitter device;

(b) detecting, by at least one transmission reader, said signal transmitted by said wireless transmitter device;

(c) processing said signal as detected by said at least one transmission reader to identify said wireless transmitter device;

(d) accessing a computer storage containing information that associates said wireless transmitter device with a component employed by said respective workstation, based upon said information representative of the identification of said wireless transmitter device identified in step (c), so as to determine what component is to be replenished at said respective workstation, wherein said respective workstation uses different components in production of said item, and wherein step (a) comprises providing a respective wireless transmitter device for each of said different components, said respective wireless transmitter device being operative, in response to a stimulus applied thereto, to controllably transmit a signal encoded with information representative of the identification of said respective wireless transmitter device, and wherein said computer storage stores information that associates a respective wireless transmitter device with said respective workstation and a respective one said different components.

2. A method according to claim 1, wherein said wireless transmitter device is further operative to provide an indication of the transmission of said signal.

3. A method according to claim 1, wherein step (c) comprises processing said signal as detected at a plurality of spatially separated transmission readers to locate said wireless transmitter device.

4. A method according to claim 3, wherein step (c) further comprises processing signals detected at said plurality of said spatially separated transmission readers to determine which signals received by said plurality of transmission readers are first-to-arrive signals as transmitted from said wireless transmitter device, and conducting time-of-arrival differentiation of said first-to-arrive signals to locate said wireless transmitter device in said production system.

5. A method according to claim 1, wherein said wireless transmitter device is operative to repetitively transmit said signal in response to the application of said stimulus.

6. A method according to claim 1, wherein said wireless transmitter device is operative to randomly and repetitively transmit a signal irrespective of said stimulus that is encoded with the identification of the wireless transmitter to enable periodic and updated location of the wireless transmitter.

7. A method according to claim 1, wherein said wireless transmitter device includes memory which stores a multibit word representative of the identification of said wireless transmitter device, and is further operative to repetitively transmit a spread spectrum signal encoded with said information representative of the identification of said wireless transmitter device.

8. A method according to claim 3, wherein step (c) comprises processing signals detected at said readers by means of matched filter correlators, each having a plurality of matched filter banks containing parallel correlators which are operative to correlate a received signal with successively time offset versions of a reference pseudo random spreading code corresponding to that of spread spectrum signals transmitted by said wireless transmitter device.

9. For use with a manufacturing facility for producing an item from a plurality of different components, which are retrieved from storage remote with respect to workstations of said facility and delivered to said workstations for use thereby in production of said item, a system for controlling replenishment of components employed by said workstations comprising:

at or in proximity of each of said workstations, at least one wireless transmitter device, which is operative, in response to a stimulus applied thereto associated with the need for replenishment of a respective component used by said each workstation, to controllably transmit a signal encoded with information representative of the identification of said each wireless transmitter device;

at least one transmission reader that is operative to detect said signal transmitted by said each wireless transmitter device;

a processing subsystem, which is operative to process said signal as detected by said at least one transmission reader so as to identify said each wireless transmitter device;

a computer storage containing information that associates respective ones of said wireless transmitter devices with respective ones of said plurality of different components and workstations associated therewith, and being operative, in response to said information representative of the wireless transmitter device identified by said processing subsystem, to indicate what component is to be replenished at said each workstation, wherein one of said workstations uses different components in production of said item, and wherein a respectively different wireless transmitter device is provided at said one workstation for each of said different components, said respectively different wireless transmitter device being operative to controllably transmit a signal encoded with information representative of the identification of said respectively different wireless transmitter device, and wherein said computer storage stores information that associates said respectively different wireless transmitter device with said one workstation and one said different components used thereby.

10. A system according to claim 9, wherein said wireless transmitter device is operative to provide an indication of the transmission of said signal.

11. A system according to claim 9, wherein said processing subsystem is operative to process said signal as detected at a plurality of spatially separated transmission readers to locate said each wireless transmitter device.

12. A system according to claim 11, wherein said processing subsystem is operative to process signals detected at said plurality of said spatially separated transmission readers to determine which signals received by said plurality of transmission readers are first-to-arrive signals as transmitted from said each wireless transmitter device, and to conduct time-of-arrival differentiation of said first-to-arrive signals to locate said each wireless transmitter device in said manufacturing facility.

13. A system according to claim 9, wherein said each wireless transmitter device is operative to repetitively transmit said signal in response to the application of said stimulus.

14. A system according to claim 9, wherein said each wireless transmitter device is operative to randomly and repetitively transmit a signal irrespective of said stimulus that is encoded with the identification of the wireless transmitter to enable periodic and updated location of the wireless transmitter.

15. A system according to claim 9, wherein said each wireless transmitter device includes memory which stores a multibit word representative of the identification of said each wireless transmitter device, and is further operative to repetitively transmit a spread spectrum signal encoded with said information representative of the identification of said each wireless transmitter device.

16. A system according to claim 12, wherein said processing subsystem includes matched filter correlators, each having a plurality of matched filter banks containing parallel correlators which are operative to correlate a received signal with successively time offset versions of a reference pseudo random spreading code corresponding to that of spread spectrum signals transmitted by said each wireless transmitter device.

17. A system for controlling replenishment of components used by workstations of a manufacturing facility to produce an item, replenished components being retrieved from storage and delivered to said workstations, said system comprising:

at or in proximity of a workstation, a call tag containing a wireless transmitter, which is operative, in response to a stimulus applied to said call tag associated with a request for replenishment of a component used by said workstation, to controllably transmit a signal encoded with the identification of said call tag;

at least one call tag transmission reader, which is operative to detect said signal transmitted by said wireless transmitter;

a reader output processing subsystem, which is operative to process signals detected by said at least one call tag transmission reader to identify said call tag;

a relational database containing information that associates respective ones of said call tags with respective ones of said plurality of different components and workstations associated therewith, and being responsive to the identity of said call tag, to indicate what component is to be replenished at said workstation, wherein one of said workstations uses different components in production of said item, and wherein a respectively different wireless transmitter device is provided at said one workstation for each of said different components, said respectively different wireless transmitter device being operative to controllably transmit a signal encoded with information representative of the identification of said respectively different wireless transmitter device, and wherein said computer storage stores information that associates said respectively different wireless transmitter device with said one workstation and one said different components used thereby.

18. A system according to claim 17, wherein said call tag is operative to indicate transmission of said signal therefrom.

19. A system according to claim 17, wherein said wireless transmitter is operative to repetitively transmit said signal in response to application of said stimulus.

20. A system according to claim 17, wherein said wireless transmitter includes memory which stores a multibit word representative of the identification of said call tag, and is further operative to repetitively transmit a spread spectrum signal encoded with said multibit word.

* * * * *